H. C. GODFREY.
Cotton Plows.
No. 133,850.
Patented Dec. 10, 1872.
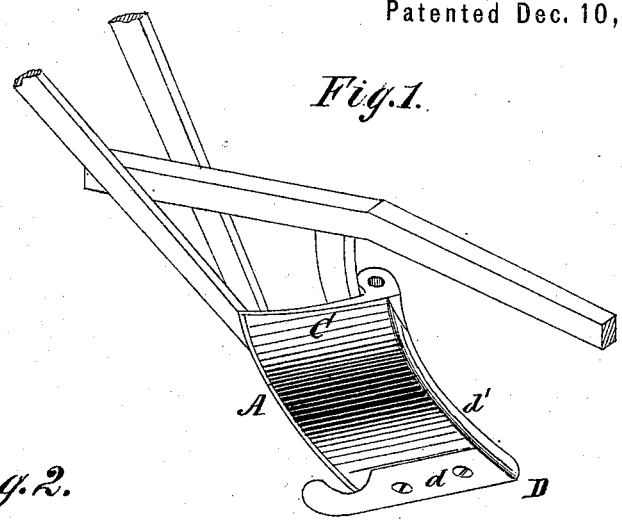
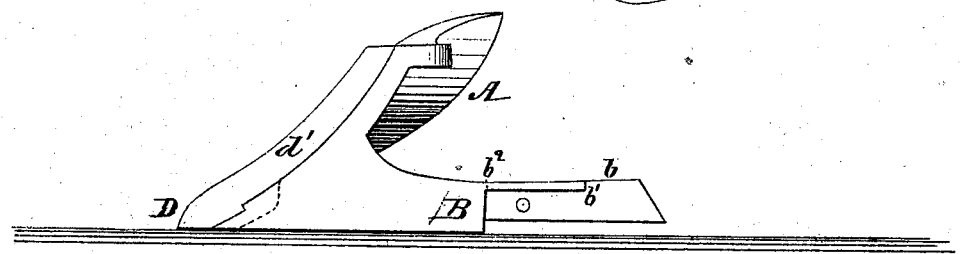
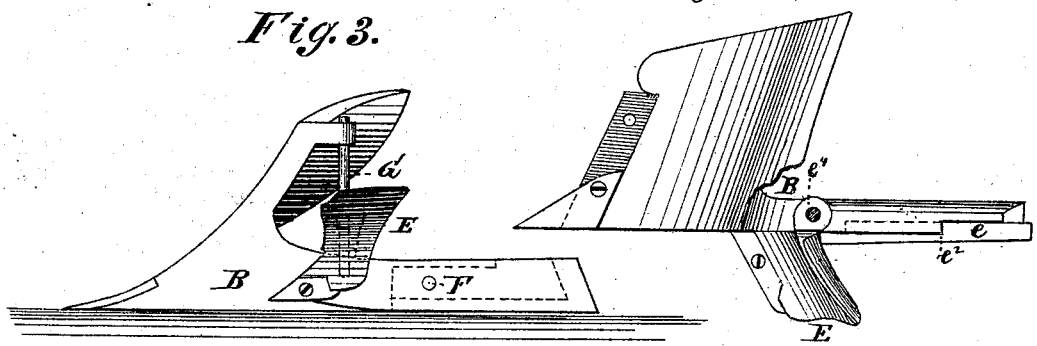
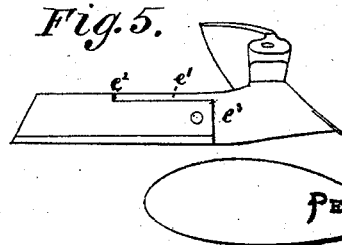
Witnesses:
G. Mathius
Solon C. Kemon
Inventor:
Henry C. Godfrey
Per ―――― Attorneys.

UNITED STATES PATENT OFFICE.

HENRY C. GODFREY, OF ELIZABETH CITY, NORTH CAROLINA.

IMPROVEMENT IN COTTON-PLOWS.

Specification forming part of Letters Patent No. 133,850, dated December 10, 1872.

*To all whom it may concern:*

Be it known that I, HENRY C. GODFREY, of Elizabeth City, in the county of Pasquotank and State of North Carolina, have invented an Improved Cotton-Plow, of which the following is a specification:

The invention relates to that class of plows which are employed in the cultivation of cotton, especially in its early growth. The invention consists, first, in the arrangement of a small turn-plow on the side, to the rear of the front and above the bottom of the land-side of a larger plow, so as to follow the scraper and throw clean soil to the stems of the young cotton-plants. The invention consists, secondly, in the mode of attaching the small plow to the land-side of the larger one.

In the drawing, Figure 1 is a perspective view of the plow with scraper; Fig. 2 is a side elevation, showing the groove in land-side; Fig. 3, a side elevation of plow when used with the turn-plow; Fig. 4, a top view of the same; Fig. 5, a side elevation of the small turn-plow.

A represents the frame of an ordinary cotton-plow with a projecting land-side, B, and mold-board C. D represents my improved scraper, consisting of two parts, $d$ $d'$, the one cutting horizontally while the other forms a guard and prevents the soil from falling over on the plants, and may also have a cutting-edge. It is applied to a groove in the lower and land-side edges of the mold-board, and fastened by screws. It may, however, be attached to the mold-board in any of the well-known ways, or in any suitable manner, without departing from the principle of my invention. E is a left-hand turn-plow of small dimensions, and secured laterally to the land-side B. It is placed at some distance from the front of land-side so that the latter will assist in guiding the fine soil up the mold-board. It is elevated some distance above the bottom of land-side so as to avoid gathering too much earth, and thus overwhelming the plant while yet small and tender. The plow E is provided with an extension, $e$, which has a groove, $e^1$, and shoulders $e^2$ $e^3$, which correspond to groove $b$ and shoulders $b^1$ $b^2$ on land-side B. The small plow E and land-side B are then jointed together and held by a horizontal bolt or screw, F, and a vertical bolt or rod, G, the latter of which passes through a perforation in the lug $e^4$. The extension $e$ is curved downward from the mold-board, and then given a horizontal bottom face which becomes flush with that of land-side B.

The operation is as follows: When the cotton has taken a start, but is yet young and small, the frame A is provided with the scraper D, which runs from three-quarters to one inch deep, or thereabout, and close up to the plants in one of the rows. The part $d$ of scraper has the effect to cut up the started growth of weeds and transfer them to the right, leaving a clean surface adjacent to the plant, while the part $d'$ effectually guards the plants from being overwhelmed by loose dirt. After this operation has been finished the scraper is removed, a common plowshare made to take its place, and the small plow E attached to the land-side B. The large plow is now run off from the row of plants so as to bring between itself and said row the small plow E. As this small plow is elevated to cut a furrow less deep than that of the large plow the quantity of soil is limited and cannot injure the plants; and as the soil on which said small plow operates has been surface-scraped, only clean fine earth is turned over and against the stems of the plants. In this second operation the larger plow covers up the weeds first cut up from the surface.

The scraper and small plow thus applied successively on the same frame A have the effect of producing an excellent tilth, relieving the crop of all weeds, and giving a fine start in its early growth.

Having thus described my invention, what I claim as new, and desire to secure by Letters Patent, is—

1. The combination, with a right-hand turn-plow, of a left-hand plow, E, of smaller dimensions, running less deeply, and attached to the land-side of large plow, as set forth, so that the fine-scraped soil will be gathered up to the plants.

2. A plow, E, provided with extension $e$, having groove $e^1$ and shoulders $e^2$ $e^3$, and perforated lug $e^4$, as specified, to adapt it to be held to a correspondingly-constructed land-side by two bolts.

H. C. GODFREY.

Witnesses:
SOLON C. KEMON,
THOS. D. D. OURAND.